United States Patent

[11] 3,604,780

| [72] | Inventor | Martin Martin<br>Poughkeepsie, N.Y. |
|---|---|---|
| [21] | Appl. No. | 820,976 |
| [22] | Filed | May 1, 1969 |
| [45] | Patented | Sept. 14, 1971 |
| [73] | Assignee | International Business Machines Corporation<br>Armonk, N.Y. |

[54] THREE-DIMENSIONAL FIBER OPTIC DISPLAY
7 Claims, 8 Drawing Figs.

[52] U.S. Cl. .................................................. 350/96 B,
350/120, 350/144, 353/10
[51] Int. Cl. ..................................................... G02b 5/16
[50] Field of Search ......................................... 350/96 B,
120, 144; 353/10, 62; 352/43, 86; 343/7.9;
178/6.5

[56] References Cited
UNITED STATES PATENTS

| 2,361,390 | 10/1944 | Ferrill............................ | 178/6.5 |
| 3,329,475 | 7/1967 | Hasala........................... | 350/96 (B) X |
| 3,462,213 | 8/1969 | Montebellow................ | 352/86 |

*Primary Examiner*—David H. Rubin
*Attorneys*—Hanifin and Jancin and A. Sidney Alpert ABSTRACT: A three-dimensional display apparatus is disclosed, having a fixed coded input source, a movable carriage carrying fiber optic elements with their input ends arranged adjacent the input source and their output ends arranged in a display face. In operation, the carriage is oscillated and a plurality of planes of an object are repeatedly displayed within a set volume by the input face, at a rate sufficient to prevent flicker.

PATENTED SEP 14 1971

INVENTOR
MARTIN MARTIN

BY *P. Sidney Olport*

ATTORNEY

THREE-DIMENSIONAL FIBER OPTIC DISPLAY

BACKGROUND OF THE INVENTION

The present invention relates generally to the field of display systems, and more particularly to optical display systems that provide three-dimensional representations of images.

There are various types of three-dimensional displays known to the prior art. By way of illustration, the following U.S. patents all pertain to three-dimensional display apparatus: U.S. Pat. No. 3,138,796, No. 2,637,023, No. 3,140,415 and No. 3,097,261.

Each of the known schemes for representing images three-dimensionally, including those shown in the above patents, suffer from several deficiencies. For example, the apparatus may be cumbersome and expensive. Furthermore, those systems that involve cathode ray tube screens or luminescent panels that rotate, oscillate or are comutated, all require some means for synchronizing the position of the display screen in space with the data to be displayed. This requires complex, costly electronic controls and requires frequent adjustments and time-consuming maintenance. Additionally, oscillatory CRT screens such as are shown in U.S. Pat. No. 3,138,796 are limited in the range of movement of the screen due to problem in refocusing the electron beam on the screen. Other prior three-dimensional displays may employ dual projection systems, stereo vision aids and the like. Such displays have obvious defects in application.

Accordingly, it is a general object of the present invention to provide a three-dimensional display system that overcomes the limitations of those three-dimensional systems available to the prior art.

It is another object of the present invention to provide a display apparatus for representing images three-dimensionally which is relatively simple in construction and operation, and hence not subject to excessive maintenance or repair.

It is another object of the present invention to provide an optical three-dimensional display system that eliminates the necessity for synchronization between information to be displayed and the means upon which the information is displayed.

Other objects of the present invention include:

A system that provides high resolution;
A system that provides a large display volume;
A system that provides both color, and black and white display capability;
A system that uses a single light source; and
A system that enables projection of a white image or any desired portion thereof.

SUMMARY OF THE INVENTION

In the preferred embodiment of the present invention, the display apparatus includes a coded input source in the form of a mask which provides a source of digital data. The mask is coded to represent a plurality of planes of a three-dimensional object to be displayed. The mask or other coded input source is fixed with respect to an information transfer unit that includes a plurality of optical fibers that provide an optical transfer medium. The input of the fibers are arranged to provide a read or pickup means and the output ends arranged in a plane to provide a display face. The optical fibers are mounted in a carriage that is reciprocably movable or oscillatable with respect to the mask by a drive motor and drive linkage mechanism. The carriage is supported in a stationary assembly including a fixed base, mask support means and carriage bearing means. In operation, with the coded mask in place, the carriage is oscillated so that the pickup means repeatedly passes the mask and receives digital data, and so that the display face moves through a set volume. In this manner, a plurality of planes of the image to be displayed are repeatedly reproduced with the volume at a frequency higher than the eye can resolve, and the image thereby produced within the volume.

The three-dimensional display system of the present invention is extremely simple in construction and operation, while offering advantages not present with existing three-dimensional display systems. For example, a major advantage of the present display system is that there is need to synchronize the data supplied to the display screen with oscillation of the screen, thereby eliminating the need for complicated and expensive circuitry or hardware for that purpose. Further in that regard, the instant invention utilizes a fixed, stored source of digital data that is essentially self-synchronizing. Other worthwhile advantages of the invention will become apparent by referring to the detailed description below.

DESCRIPTION OF THE PREFERRED EMBODIMENT

Figure 1:
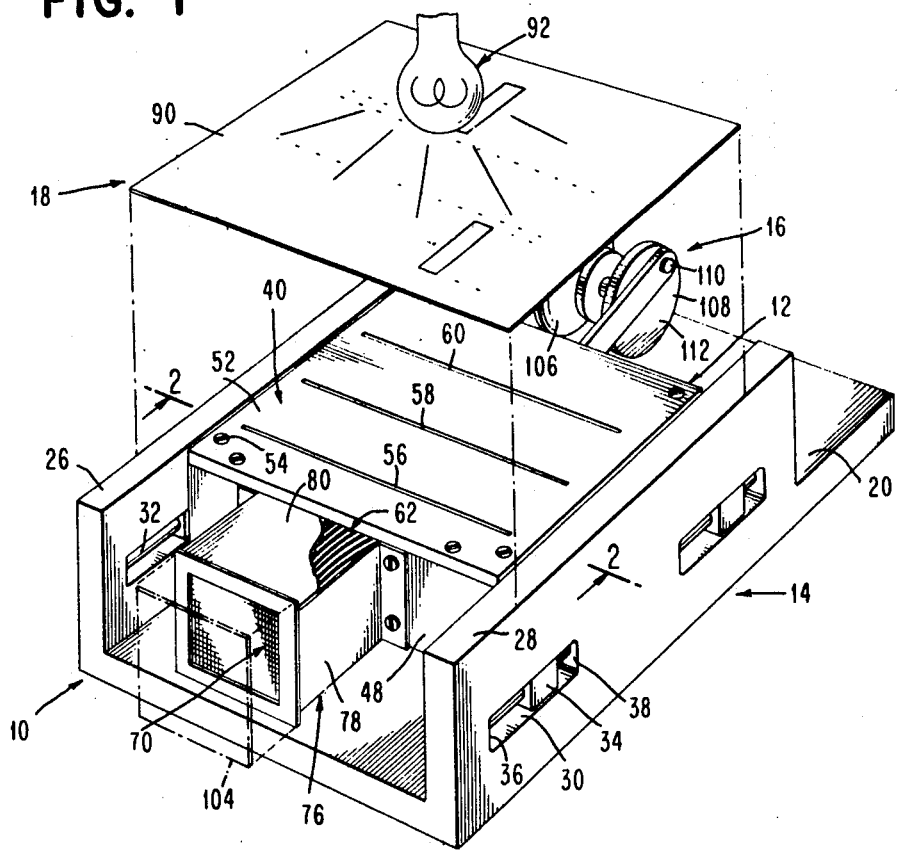
FIG. 1 is a perspective view of the preferred embodiment of the instant invention, with the coded mask exploded away to illustrate the details thereof.

Referring now to more specifically to the drawings, and particularly to FIGS. 1–5, there is disclosed a three-dimensional display apparatus or system generally designated by reference numeral 10. The display system 10 includes four major parts, an information transfer unit or assembly 12, a stationary supporting unit assembly 14, a drive assembly 16 and a digital data source 18. Each of these parts is comprised of various subassemblies as will be seen hereinafter.

Figure 2:
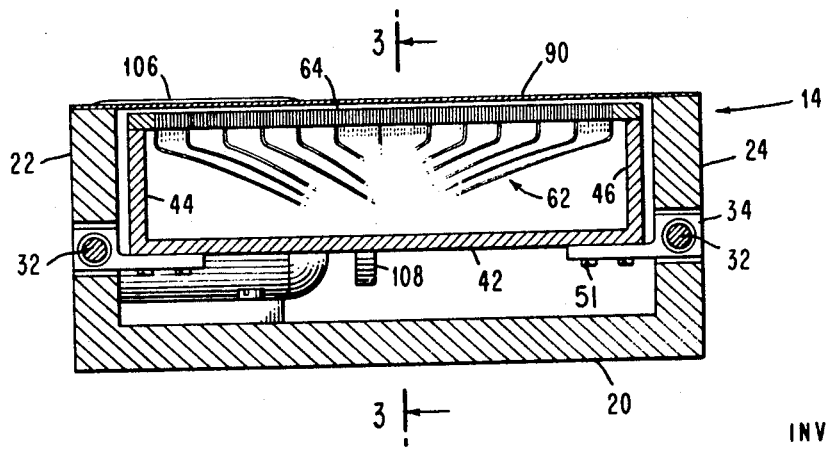
FIG. 2 is a cross-sectional view taken generally on the plane of line 2—2 of FIG. 1.

The functions of the stationary supporting unit or assembly 14 are essentially threefold; it supports the data source 18, provides a reciprocatory mount for the information transfer unit 12 and provides a mount for the drive assembly 16. The stationary unit 14 essentially comprises a base member 20 having upstanding generally parallel walls 22 and 24. The upper surfaces of the walls, respectively designated 26 and 28 provide supporting surfaces for the data source. Cutout portions 30 in the walls 22 and 24 each includes a slide or journal 32 for slidably receiving a bearing block 34 which, as will be seen particularly in FIG. 2, provide a slidable mounting for the information transfer unit 12. Furthermore, the ends 36 and 38 of each of the openings 30 provide forward and rearward limits to travel of the unit 12.

The information transfer unit 12 includes a hollow boxlike carriage 40 having a bottom wall 42, sidewalls 44 and 46, and front and rear walls 48 and 50 respectively. The previously mentioned bearing blocks 34 are mounted to the bottom wall 42 by suitable mounting means such as bolts 51. Mounted on the carriage 40 is an upper, apertured plate 52, fastened thereto by screws such as 54. The apertured plate 52, in the preferred embodiment, has three elongate generally parallel slits or openings 56, 58 and 60, the purpose of which will become apparent by referring particularly to FIGS. 2 and 3. This, as will be seen in these figures, there is mounted in the carriage an optical transfer medium in the form of a plurality of fiber optic light carriers or elements generally designated by reference numeral 62. The fiber optic light carriers in the preferred embodiment are ten mil outer diameter flexible plastic fibers, having input ends 64 and output ends 66. The input ends of the fibers are mounted within the slits 56, 58, and 60 and oriented upwardly towards the digital data source 18. In the illustrated embodiment there are a total of 1681 optical fibers.

In order to display three-dimensional information, the information transfer unit includes a planar display face generally designated by reference numeral 70. The display face 70 includes a plate 72 having 1,681 12-mil diameter holes or opening whose center lines are 50 mils apart. The plate 72 is an x-Y matrix of openings, 41 by 41 in the X and Y directions. In the illustrated embodiment, the plate 72 measures 2 inches by 2 inches. Within each of the 1681 holes, there is located an end 66 of one of the fiber optic elements. Thus, it will be understood that there are 1,681 digital data positions, and that the data points in the preferred embodiment comprise the fiber optic element output ends 64 located approximately one-twentieth of an inch apart in the planar display face 70.

Figure 3:
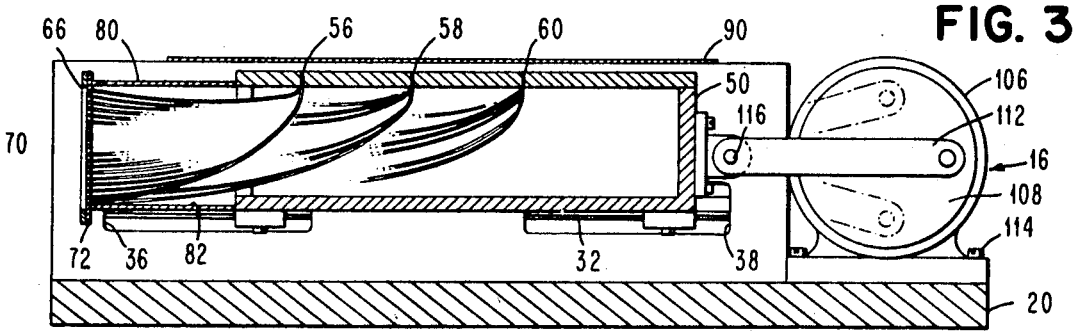
FIG. 3 is a cross-sectional view of the display apparatus of FIG. 1 taken generally on the plane of line 3—3 of FIG. 2.

The planar display face 70 is mounted in a boxlike structure generally designated by reference numeral 76 which extends outwardly from the front wall 48 of the carriage 40 as will be seen in particular in FIGS. 1 and 3. The boxlike structure 76 includes sidewalls 78 (only one shown) and top and bottom walls 80 and 82, which support the mounting plate 72. As will also be seen in FIGS. 1 and 3, in conjunction with FIG. 2, the input ends 64 of fiber optic elements 62 are arranged vertically, with approximately one-third of the elements located in each of slits 56, 58 and 60. In the preferred embodiment, in order to save material and space, it was decided to arrange the input ends 64 of the fiber optic elements 62 in the three parallel rows, which are approximately 2 inches apart, and also arrange the data source 18 accordingly. However, if desired, all of the input ends 64 of the fiber optic elements 62 could be placed in a single row, or in additional rows greater than the three rows 56, 58, and 60, so long as they correspond to the source of digital data 18 as will be understood hereinafter.

In the illustrated display apparatus 10, there are 574 fiber optic elements in each of slits 56 and 58, arranged in fourteen groups of 41 elements each, and 538 elements in slit 60 arranged in 13 groups of 41 elements. Each of the groups of fiber optic elements within the slits 56, 58 and 60 extend to the face 70, and comprise one of 41 data points. In the apparatus 10, as shown in FIGS. 1-3, the outputs ends of fiber optic elements 62 within slit 56 provide the left one-third (or 14 columns when viewing the apparatus form the vantage point of FIG. 1), the elements of silt 58 from the middle 14 columns, and the elements from slit 60 form the right 13 columns.

Figure 4:
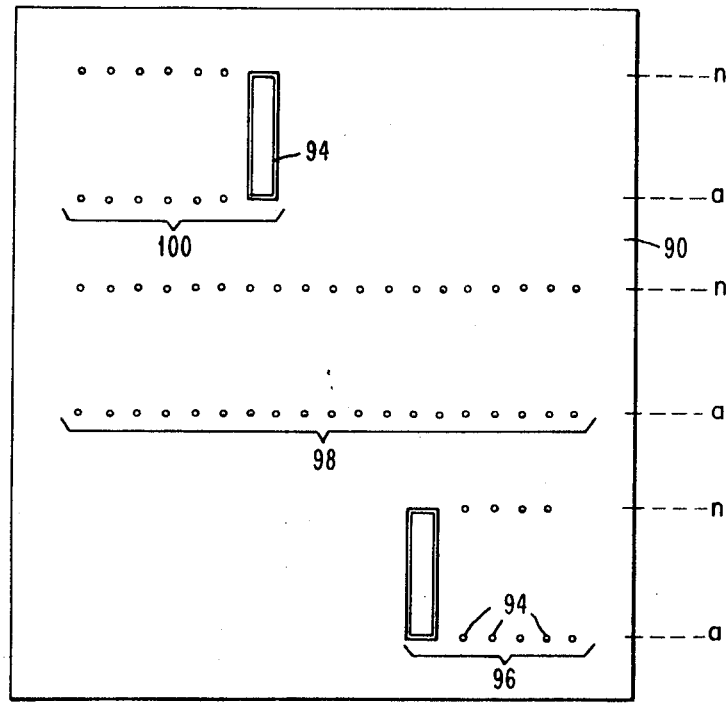
FIG. 4 is an enlarged plan view of the coded mask comprising an aspect of the invention.
Figure 5:
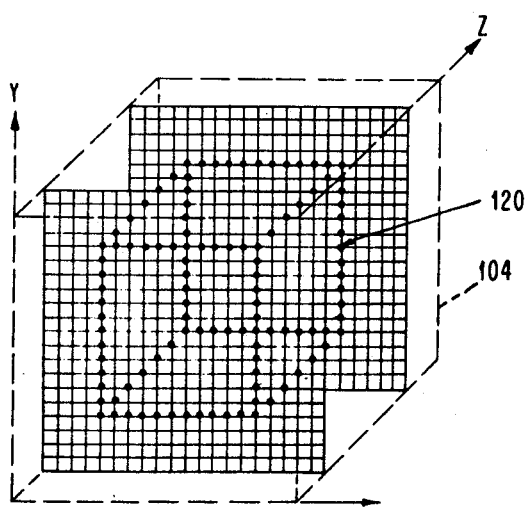
FIG. 5 is a three-dimensional representation of the image formed by the illustrated apparatus when using the mask of FIG. 4.

The digital data source 18 includes a coded mask 90 and a light source generally designated by reference numeral 92. As will be seen in particular in FIGS. 2 and 3, the mask 90 is supported on mask support surfaces 26 and 28 of the supporting unit 14. Referring particularly to FIG. 4, it will be noted that the mask 90 is an opaque sheet having coded information taking the form of transparent openings such as designated by reference numeral 94 therein. The digital data 94 in mask 90 is arranged in three groups, 96, 98 and 100, corresponding respectively to the input ends 64 of the fiber optic elements contained within slits 56, 58 and 60 respectively. Of course, if as indicated above, all the input ends of the fiber optic elements 62 were arranged in a single line, the coded data or information 94 in mask 90 would be arranged in a single group rather than the three groups 96, 98 and 100. The particular coded data shown in the mask 90 of FIG. 4, which is essentially a two-dimensional coded representation of a plurality of planes of a cube, results in the display shown in FIG. 5, i.e., a cube 120 being displayed However, as will be appreciated by those skilled in that art, the resolution of the displayed information may easily be increased to 50 points per inch or greater, merely by providing additional fiber optic elements. This may be accomplished easily be utilizing smaller outer diameter glass clad rods, which are commercially available in sizes ranging down to three mils outer diameter.

In order to obtain the Z dimension and thereby provide the third dimension within volume 104, the planar display face 70 is oscillated within such volume. It will be understood that the drive assembly 16 is provided to obtain oscillation or reciprocation of the carriage 40 and hence planar display face 70, but the face 70 could be separately movable if desired. Thus, as will be seen in particular in FIGS. 1 and 3, the drive assembly or oscillation means 16 includes a drive motor 106, a drive wheel 108, a pin 110 that is eccentrically mounted on the wheel 108 and a drive linkage member 112. The motor 106 used in the preferred embodiment was a DC motor rated at 115 volts and 0.36 amps having a nominal drive speed of 1,725 r.p.m. and rated nominally at one-fiftieth hp. As will be seen, the motor is mounted by bolts 114 on the base 20 of unit 14. The linkage member 112 extends between the pin 110 and a pin 116 connected to the rear wall 50 of carriage 40. During rotation of the wheel 108, the Z motion of the planar display face 70 is achieved with the linkage member 112 going through the positions as partially indicated in FIG. 3. within the set volume 104. Thus, when the three groups of fiber optics are positioned along the three rows, n, in FIG. 4, the upper horizontal portion of the four part opening identified as 94 in group 100 forms the left most vertical edge of the rear face of the cube in FIG. 5. Similarly, the laterally elongated opening in group 96 forms the right most rear vertical edge. The circular openings in these three rows form the upper and lower horizontal edges of the back face of the cube. Points where openings do not appear in the three n rows correspond to regions outside these four lines in the rear most plane of the display. As the fiber optics are moved forward, illumination occurs only along the four vertically extending openings in the mask of FIG. 4. These openings produce the z dimension edges of the cube in FIG. 5. When the fiber optics reach the three rows a, the four front edges of the cube are formed in the way already described for the four rear edges. The volume 104 represents a two inch cube having X and Y dimensions of two inches (or the dimensions of display face 70) and a Z dimension also two inches resulting in an eight cubic inch volume 104. There are, as explained above, 1,681 data points in the X-Y plane providing a linear resolution of approximately twenty points per linear inch.

The planar face 70 moves through the set volume 104, having a distance of travel from the initial position shown in FIG. 1 to the position shown by dash lines, outwardly of the walls 22 and 24, for two inches and back again. In this manner, a number of planes of the cube 120 is displayed within the set volume. Since the planar face 70 moves at a repetition rate of approximately 25 oscillations per second, flicker is eliminated and the discrete points of light of each plane of the image 120 are made to visually persist as the display face 70 passes along the Z axis. It will be appreciated that the object or image to be displayed within the set volume 104 is displayed without any necessity for synchronizing the digital data appearing on display face 70 with the position of the same. That is to say, the source of digital data is inherently in synchronism with the position of the display face as the input ends 64 of the fiber optic elements pass or sweep under the coded mask 18 and receive illumination through the transparent openings 94 in the mask. It will be appreciated, of course, that the mask represents a coded source of digital data representative of a plurality of planes of the three-dimensional object or image 120. Thus, referring to FIG. 4, with the display face 70 in its forwardmost position, the input ends 64 of the fiber optic elements 62 will be respectively adjacent the forward data positions of the three sets of data 96, 98 and 100, designated "a," and as the carriage 40 moves rearwardly, the input ends 64 of the fiber optic elements move rearwardly under the mask 90 and receive digital data therefrom to rearmost position "n." The fiber optic elements 62 form digital transmitting means for conveying the information received from the source of digital data 18 to display face 70 and each of the points of light on the image 120 reappears in the same position once for each cycle of the display face 70 as the display face oscillates through the volume 104.

While the mask 90 is shown supported on supports 26 and 28, and the input ends 64 of the fiber optic elements 62 are arranged adjacent that position of the mask, it will be appreciated that other alternative arrangements therefor are within the scope of this invention. For example, a plurality of masks such as mask 90 may be supported adjacent the path of movement of carriage 40, such as adjacent its sidewalls 44 and 46 and bottom wall 42, as well as adjacent plate 52 as illustrated in the drawings. Of course, the input ends of the fiber optic elements 62 would then be located adjacent each of these plurality of masks, and the elements 62 all lead to display face 70. This alternative configuration is easily accomplished as the flexible fiber optic elements are readily routed within carriage 40.

While the cubic image 120 was shown in conjunction with the display apparatus 10 as formed by the coded input source 90, it will be readily apparent that other three-dimensional images may readily be represented. Thus, among other three-dimensional images that have been displayed by the present invention are an airport scene with airplanes on the field and in the air in their relative positions, and a drawbridge showing the sides of the bridge and the bridge bed. In each case, it is possible, when viewing the three-dimensionally represented image, to view it from either side and obtain a different perspective of the image. That is to say, the image represented by the apparatus within the volume 104 is actually three-dimensional. Furthermore, the image may be in black and white, or in color, if desired, merely be presenting color transparent coded data within the coded mask 90. Furthermore, it will be readily apparent that while in the embodiment shown in the drawings, the actual size of the volume was eight cubic inches, this volume could be readily expanded by providing a larger display face, either having additional data positions therein or the same number of data positions with less resolution, and by increasing the dimension, by increasing the range of movement of the display face 70. Other various alternatives to the apparatus 10 will readily occur to those skilled in the art, such as for example, the use of the front mask 130 shown in FIG. 6.

Figure 6:
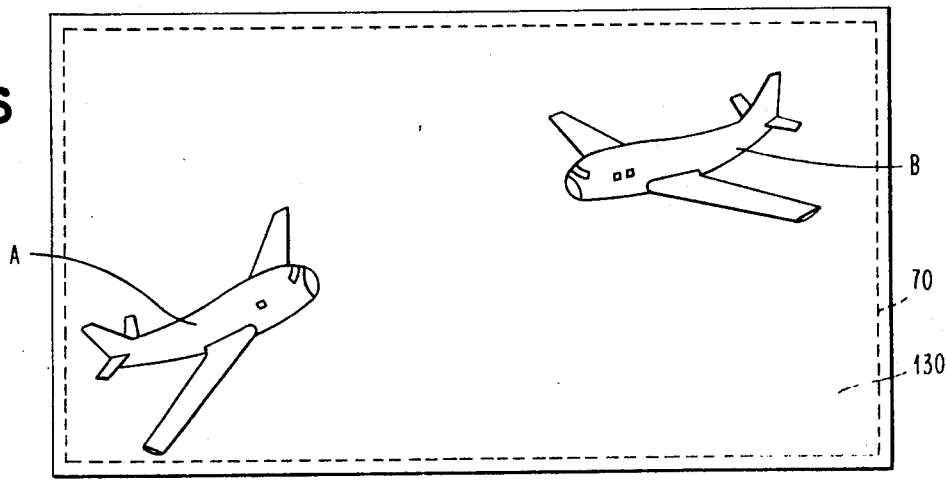
FIG. 6 is a plan view of a front mask useful with the apparatus of FIGS. 1–3.
Figure 7:
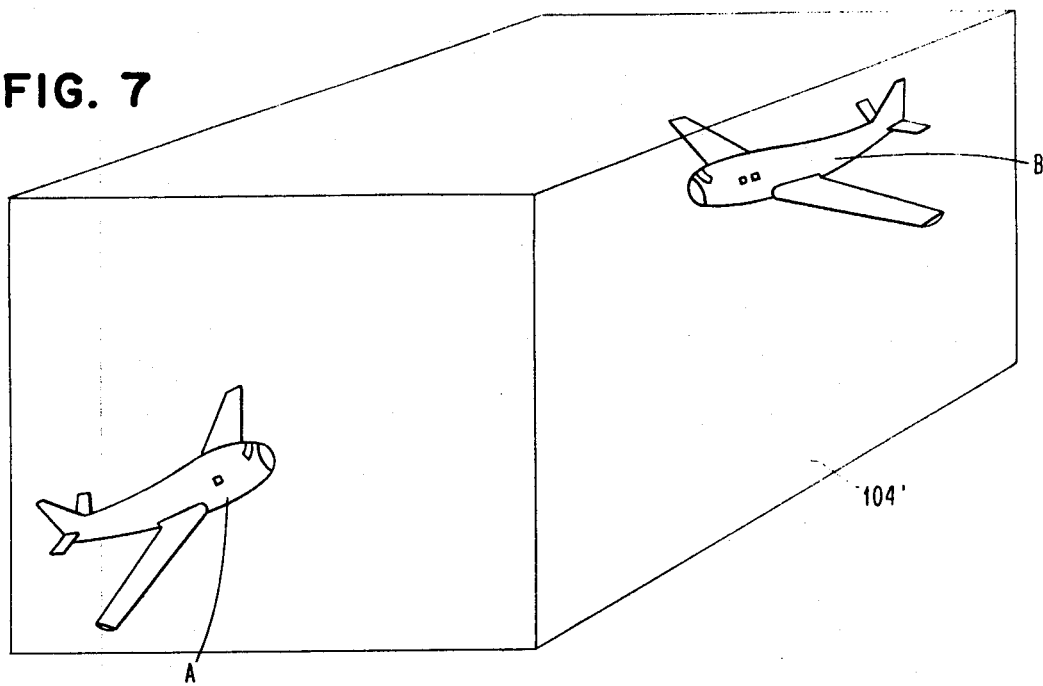
FIG. 7 is a view similar to that of FIG. 5 illustrating the image provided by the front mask of FIG. 6.

The front mask 130 is adapted to be mounted over the display face 70 for movement therewith, as shown in FIG. 6. The front mask 130 is an opaque mask having, in the example, transparent outlines of two airplanes A and B. This has been shown merely by way of example, of course. In the mask, the airplanes are in the same plane, and appear to be on a collision course. However, by proper construction of a coded input mask such as mask 90, the two airplanes A and B may be made to appear to be displaced within the set volume 104' as shown in FIG. 7. To achieve the effect of FIG. 7, the coded mask is arranged to permit light to be transmitted to the front face through the fiber optic elements in slit 56 only when the display face 70 is in its forwardmost position, while permitting light to be transmitted through the fiber optic elements in slit 60 only when the display face 70 is in its rearwardmost position. This arrangement would permit the airplanes A and B to appear displaced along the Z axis or dimension of the set volume 104' as shown in FIG. 7. Each of the airplanes A and B would appear as a full line representation inasmuch as their representation in front mask 130 is a continuous line, and the light provided by the fiber optic elements thereto will illuminate the full image of each airplane. Other alternative arrangements with the use of a front mask 130 in conjunction with a coded input mask 90 will be readily apparent to those skilled in the art.

Figure 8:
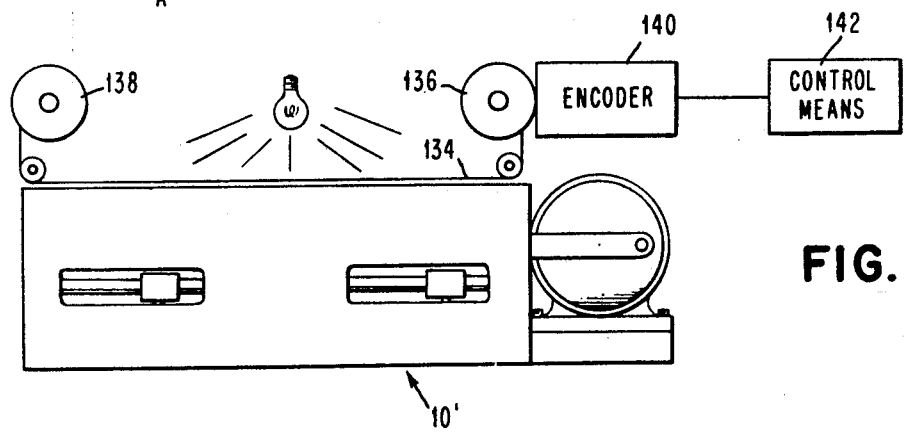
FIG. 8 is a simplified elevational view of another embodiment of apparatus of the invention.

While the display apparatus 10 of the preferred embodiment is shown as a static device, or a device having a single input image to be displayed, it will be readily apparent that the display apparatus may be used as a dynamic three-dimensional display device. Reference should be made to FIG. 8 wherein there is shown a display apparatus 10' which is essentially the same as the display apparatus 10 described above. However, in this case, rather than a single coded mask 90, an opaque roll of flexible sheet material 134 is provided between input and takeup rolls 136 and 138. The sheet material 134 may be an opaque paper, Mylar material or the like. The rolls 136 and 138 may be appropriately supported in relation to the apparatus 10' so that the sheet material 134 will be supported on mask support surfaces 26 and 28 as is mask 90. In order to provide a dynamic, or changeable display, an encoder generally designated by reference numeral 140 is provided adjacent the input roll 136, and connected to an appropriate control means 142 for operation thereof. The encoder may take the form of a mechanical punch, a laser, an electrostatic perforator, or the like in order to form the digital coded information in the sheet 134 under the roll of the control means. Thus, the "picture" displayed within the set volume 104 may be readily changed merely by providing a new set of input data within the sheet 134 and locating that input data over the aperture plate 52. Other means of obtaining a dynamic display device will also occur to those skilled in the art. For example, a conventional CRT display may be located facedown in the place of the coded mask 90 over the aperture plate 52. The CRT could then provide coded input data in much the same manner as the mask 90 and light source 92, and the input source could be readily changed by proper programming of the CRT controls. In addition, in this manner, a computer may be used in conjunction with the CRT to provide a real time, dynamic three-dimensional display device.

In view of the above description of the invention, it will be apparent to those skilled in the art that the present invention provides a simple, yet extremely useful way of displaying three-dimensional information. The device 10 is especially useful since it does not require synchronization of input information and display screen position as previously explained. Furthermore, the mechanical makeup of the unit itself is extremely simple in construction and relatively maintenance free. While several possible uses of the device have been previously explained others will become readily apparent. For example, the device may be used to represent molecular structures for physics or chemistry studies, or may be useful as a readout device for data stored in various optical storage devices. Further, it may be used in the classification of data with the third dimension representing time, space, etc. An example of this would be in geographical sales-mapping, inventory control, statics, quality control, or three-dimensional coded identification card usage. Another potential use of the device would be in information retrieval, where a complete text might be coded on a mask and the apparatus 10 would be able to display one plane of information at a time, such as one complete page of test which would appear at some plane within the set volume 104. A light mask could then be used above the coded mask 90 for strobing the coded mask to select the appropriate page and operate the display device, or alternatively the light source 92 would be movable with respect to the mask and strobed to select the appropriate plane of information. Another important advantage of the invention is that the third or Z dimension of the set volume 104 is limited only the extent to which it is desired to move the display face 70. This is a decided advantage over the prior oscillating CRT screens which were limited in the third or Z dimension due to the inability to rapidly refocus, as mentioned above.

While the invention has been particularly shown and described with reference to preferred embodiments thereof, it would be understood by those skilled in the art that the foregoing and other changes in form and detail may be made therein without departing from the spirit and scope of the invention.

I claim:
1. A three-dimensional display system, comprising a plurality of optical fibers each having a light receiving end and a light emitting end, means mounting said light emitting ends to form a display face on which an image is formed according to the illumination of said light receiving ends, and means mounting said light receiving ends in a fixed relationship to said display face and in a predetermined pattern in which each said end is positioned along a predetermined path that is independent of the means for moving said display face generally linearly in the direction of viewing through a volume at a sufficient rate to form a viewable three dimensional image from a succession of two dimensional images formed on said display face, means providing a coded representation of said succession of two dimensional images, means for effecting relative scanning movement between said light receiving ends and said coded representation means, and means for illuminating said light receiving ends at a succession of positions along said paths as said display face is moved through said volume in accordance with the coded representation of the two dimensional image corresponding to the position of the display face.

2. The display system of claim 1 wherein said means for illuminating said light receiving ends of said optical fibers comprises a source of light and a coded mask positioned between said source of light and said light receiving ends.

3. The display system of claim 1 wherein said pattern comprises a plurality of groups of fiber optics spaced apart in the direction of the scanning movement by at least the distance of said scanning movement to maintain the paths of one group independent of the paths of the other group.

4. The display system of claim 1 wherein said means providing a coded representation comprises an opaque sheet having coded light transmitting openings.

5. The display system of claim 4 wherein said openings are arranged in rows and columns in said sheet, each row corresponding to a two dimensional image plane, said rows being arranged in the sequence in which said image planes are presented in said three dimensional image, the openings of each column corresponding to a particular point in said display face.

6. The display system of claim 5 wherein selected ones of said openings are elongated along said rows.

7. The display system of claim 5 wherein selected ones of said openings are elongated along said columns.